Sept. 30, 1930.  H. JACOBSEN  1,777,265
SELF CENTERING CUTTER HEAD FOR PRECISION BORING MACHINES
Filed July 5, 1929
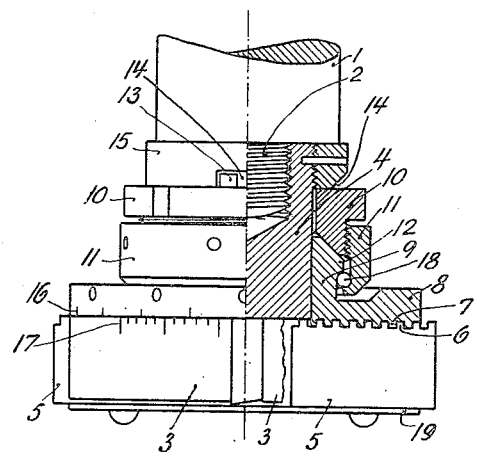
Inventor
H. Jacobsen
By: Marks & Clerk
Attys.

Patented Sept. 30, 1930

1,777,265

UNITED STATES PATENT OFFICE

HELGE JACOBSEN, OF SKAERERIVEJ, GLOSTRUP, DENMARK, ASSIGNOR OF PART INTEREST TO WILLIAM THOMSEN, OF COPENHAGEN, DENMARK

SELF-CENTERING CUTTER HEAD FOR PRECISION BORING MACHINES

Application filed July 5, 1929, Serial No. 376,134, and in Germany July 17, 1928.

The object of the present invention is a cutter head for precision boring machines and similar machine tools. The cutter head serves for instance to ream worn originally cylindrical holes and is used especially for re-boring worn automobile and engine cylinders.

The distinguishing feature of the invention is that the blades of the cutter head can be adjusted to a definite diameter by rotation of a spiral and can be secured in position by means of a stopping device, which enables the blades to be withdrawn to a smaller diameter than the one to which they are adjusted, so that the cutter head may be introduced into the piece of work and may center the same while it is being fixed, whereafter the cutter head is again withdrawn from the cylinder and may be adjusted again, with great accuracy, to its former diameter.

The invention is illustrated on the drawing which shows a side elevation of a cutter head according to the invention, partly in section.

Referring to the drawing, 1 is the cutter spindle with a threaded neck 2 on to which a cutter head 4 fitted with guides 3 is screwed. Between the guides 3 blades 5 may slide which are fitted on their top side with teeth 6 fitting into the grooves between the windings of a spiral 7 on a flange 8, which latter is adapted to be rotated relatively to the head 4. The flange 8 is fitted with a sleeve 9 which is conical at top and fits into a corresponding conical recess in a ring 10, and the conical faces of the sleeve 9 and the ring 10 can be pressed together by means of a flanged nut 11, which suitably engages a shoulder 12 on the sleeve 9 and is fitted with inside thread co-operating with the outside thread on the ring 10. This ring supports a pin 13 adapted to travel a certain limited distance in a slot 14 in a ring 15 which may be attached either to the head 4, as shown on the drawing, or to the spindle 1 itself. The peripheries of the flange 8 and the rings 10 and 11 are fitted with holes, facets, notches or the like, so that by the use of suitable tools they may easily be rotated relatively to each other and to the spindle 1, and the flange and the guides 3 are fitted with scales 16 and 17, so that the position of the flange 8 relatively to the slides 3 may be read off. Further a nest of balls 18 may be inserted between the flanged nut 11 and the shoulder 12.

At the bottom the cutter head is closed by means of a plate 19 maintaining the blades in position.

It will now be easy to see that the blades, when the cutter head is tightened up, may be moved some distance back and forth by rotation of the ring 10, the said rotation being limited by the pin 13. When the ring 10 is rotated it will take the flange 8 and, thereby, the spiral 7 along, whereby the blades will be moved.

The cutter head is used in the following manner:

It is adjusted to the desired diameter by rotation of the flange 8, and the flanged nut 11 is tightened up, care being taken that the ring 10 should be in the position where the blades are pushed forward as far as possible. Now the ring 10 is turned into its other extreme position, and the cutter head is introduced into the cylinder and is centered in the same by the ring 10 being rotated so far that the blades touch the cylinder wall, whereafter the cylinder is fixed to the boring machine.

The blades are then withdrawn towards the axis, the cutter head lifted up from the cylinder and the blades moved all the way forward by rotation of the ring 10 into its former position, whereafter the re-boring may be effected.

Having now described my invention, what I claim as new and desire to secure by Letters Patent is:

1. A self-centering cutter head for preliminary step of centering the work for precision boring machines and the like comprising radially movable blades, teeth on one side of said blades, a sleeve having a flange and a shoulder, a spiral groove on said flange in which said teeth engage, the top of said sleeve being conical, a ring having a conical recess into which the conical upper end of said sleeve fits, and a flanged nut screwthreaded on to said ring and engaging the shoulder on said sleeve to press the sleeve and ring together, so that the movement of the blades is effected by rotation of the sleeve, the spiral normally holding the blades in adjusted position.

2. A cutter head as claimed in claim 1, characterized by the provision of a pin supported by the ring adapted to limit the travel of the ring, and a second ring attachable to the head having a slot therein limiting the movement of the pin.

In testimony whereof I affix my signature.

HELGE JACOBSEN.